Figure 1:
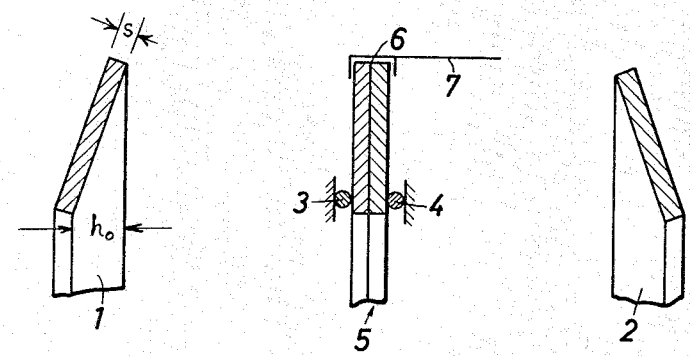

United States Patent
Maucher

[11] 3,868,100
[45] Feb. 25, 1975

[54] SPRING ELEMENT
[75] Inventor: Paul Maucher, Sasbach, Germany
[73] Assignee: Luk Lumellen und Kupplungsbau GmbH, Buhl/Baden, Germany
[22] Filed: June 20, 1973
[21] Appl. No.: 371,761

[30] Foreign Application Priority Data
June 24, 1972 Germany............................ 2231035

[52] U.S. Cl. .............................................. 267/162
[51] Int. Cl. .............................................. F16f 1/34
[58] Field of Search ..................... 267/159 V, 162 V

[56] References Cited
UNITED STATES PATENTS
2,482,449  9/1949  Wells ................................. 267/162
3,519,096  7/1970  Lunzer ............................... 267/162

Primary Examiner—James B. Marbert
Attorney, Agent, or Firm—Herbert L. Lerner

[57] ABSTRACT

A spring element, particularly a toggle spring element, is provided in which the positive and negative segments of the characteristic curve may be of equal magnitude and uniform shape. Two conically arranged cup springs, the characteristic curve of each of which has a rising segment and a falling segment, are clamped together in opposition to each other and at least approximately parallel to each other by a pair of seats which engage the cup springs in the same diameter.

3 Claims, 2 Drawing Figures

SPRING ELEMENT

This invention relates to spring elements, such as are known under the designation "toggle switch elements" and are widely used, for instance, to trigger or execute switching and control operations. Toggle springs with a characteristic curve having a positive and a negative segment and which springs are in the form of cup springs are also known. In such toggle spring elements, however, the negative segment of the characteristic curve is always smaller than the positive segment. If several such toggle cup springs are used stacked on top of each other, the differences in the segments of the characteristic curves add up and the differences in the individual segments of the characteristic curves are further magnified. Moreover, such toggle cup springs are extremely difficult to manufacture and, because of the stress peaks that occur, are also very prone to breakage.

It is an object of the present invention to provide toggle spring elements in which these disadvantages do not occur, i.e., which excel through simple and inexpensive manufacture and high operational reliability and in which, in addition, any desired variation of the segments of the characteristic curves can be obtained, including positive and negative segments of equal magnitude and uniform shape.

According to the invention, this is achieved by the combination of at least two conically arranged cup springs the characteristic curve of each of which has a rising and a falling segment, which are clamped together in opposition to each other and at least approximately parallel by seats engaging on both sides on the same diameter, whereby a resulting characteristic curve having positive and negative segments is obtained. In this connection it is particularly advantageous that cup springs having an $h_o : s$ ratio greater than 1.8 be used, in which $h_o$ and $s$ are, respectively, the inner height and the thickness of the cup spring.

The toggle spring according to the present invention can be clamped, depending on the application, in such a manner that the clamp seats engage at the radially outer diameter or radially further inward and either the radially outer or the radially inner diameter area transmits the force when the spring element is pushed or pulled by an impulse beyond its unstable equilibrium position (plane position) in the one or the other direction.

Such spring elements can be used, for instance, for the most varied switching and control operations such as in electric switching devices, but also for friction clutches.

Figure 2:
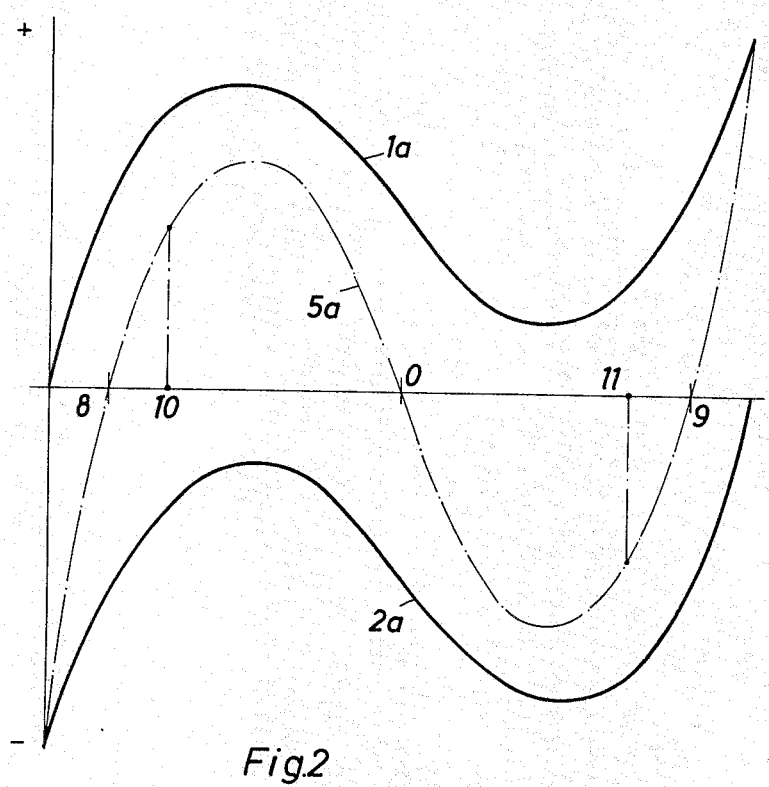

The invention will be explained more fully with reference to FIGS. 1 and 2, in which:

FIG. 1 is a schematic illustration of two conically arranged cup springs individually and assembled according to the invention; and FIG. 2 is a graph having plotted thereon the characteristic curves of the individual and assembled springs of FIG. 1. The two cup springs having rising and falling segments in their characteristic curves 1, 1a (FIG. 2) are clamped together in opposition and at least approximately parallel by seats 3, 4 engaging on both sides on the same diameter, to form a spring element 5 (FIG. 1). The spring element 5 has the characteristic curve 5a, shown by a dash-dotted line (FIG. 2), corresponding to a toggle spring. In FIG. 1 the spring element 5 is shown in the unstable zero position. An element 7 engages the spring element 5 at the force transmission area 6 thereof, which in the illustrated embodiment is at the outer diameter of the spring element 5. Upon the action of a force in the one or the other direction the spring element flips over in the one or the other direction, and specifically, either to the point 8 or to the point 9 of the combined characteristic curve 5a in FIG. 2.

The invention is not limited to the illustrated embodiment of the cup springs 1, 2. Cup springs consisting of arms or, for instance, cup springs having tabs protruding beyond the circular base body can also be used. Furthermore, the cup spings can also be clamped together in an arrangement opposite to that shown, the clamp seats on both sides, so-called flip seats, being then situated opposite each other in the outer diameter region. If such spring elements are used as switching elements, the segment of the characteristic curve 5a situated between 10 and 11 (FIG. 2), i.e., that range of the characteristic curve 5a which extends beyond the respective peak by a predetermined amount in each position, can advantageously be used.

I claim:

1. Spring element comprising in combination at least two conically formed cup springs, the characteristic curve of which has a rising segment and a falling segment, and a pair of seat means engaging the cup springs on both sides thereof at the same diameter for clamping said cup springs together at least substantially parallel to each other and with oppositely extending conicity, said cup springs being tippable together and in substantially parallel relationship with each other in two contrary directions about said pair of seat means.

2. A spring element according to claim 1, in which the ratio $h_o : s$ is greater than 1.8, in which $h_o$ and $s$ are, respectively, the inner height and the thickness of the cup spring.

3. Spring element comprising in combination at least two conically formed cup springs, the characteristic curve of which has a rising segment and a falling segment, and a pair of seat means engaging the cup springs on both sides thereof at the same diameter for clamping said cup springs together at least substantially parallel to each other and with oppositely extending conicity, said cup springs being tippable about said seat means together and in substantially parallel relationship with each other out of an unstable position thereof into two contrary positions with contrary force directions.

* * * * *

UNITED STATES PATENT OFFICE
CERTIFICATE OF CORRECTION

PATENT NO. : 3,868,100
DATED : February 25, 1975
INVENTOR(S) : Paul Maucher

It is certified that error appears in the above-identified patent and that said Letters Patent are hereby corrected as shown below:

In the heading to the printed specification, line 3, "Lumellen" should read --Lamellen--.

Signed and sealed this 27th day of May 1975.

(SEAL)
Attest:

RUTH C. MASON
Attesting Officer

C. MARSHALL DANN
Commissioner of Patents
and Trademarks